United States Patent [19]
Hicklin et al.

[11] 4,071,651

[45] Jan. 31, 1978

[54] TREATMENT OF FIBROUS MATERIAL

[75] Inventors: Denis Raymond Hicklin, Bath; Derek Graham Walter White; Brian William Attwood, both of Bristol, all of England

[73] Assignee: Karl Kroyer St. Anne's Limited, Bristol, England

[21] Appl. No.: 756,713

[22] Filed: Jan. 4, 1977

Related U.S. Application Data

[63] Continuation of Ser. No. 617,647, Sept. 29, 1975, abandoned.

[30] Foreign Application Priority Data

Oct. 10, 1974 United Kingdom ............... 43985/74
Apr. 9, 1975 United Kingdom ............... 14475/75

[51] Int. Cl.$^2$ ............................................. B32B 7/00
[52] U.S. Cl. ................... 428/284; 156/62.2; 156/62.8; 156/280; 156/324; 229/3.5 R; 427/324; 428/291; 428/485; 428/534

[58] Field of Search ...................... 156/62.2, 280, 307, 156/324, 62.8; 427/324; 428/280, 282, 284, 291, 484, 485, 486, 498, 534, 535; 229/3.1, 3.5 R

[56] References Cited

U.S. PATENT DOCUMENTS

| | | | |
|---|---|---|---|
| 3,085,026 | 4/1963 | Weisgerber et al. | 428/182 |
| 3,214,323 | 10/1965 | Russell et al. | 428/302 |
| 3,431,162 | 3/1969 | Morris | 428/498 |
| 3,468,823 | 9/1969 | Graham et al. | 428/498 |
| 3,906,142 | 9/1975 | Dowthwaite et al. | 428/498 |

*Primary Examiner*—James J. Bell
*Attorney, Agent, or Firm*—Larson, Taylor and Hinds

[57] ABSTRACT

A process for making a multi-ply consolidated dry-formed fibrous web having at least three plies, the outer plies are impregnated with a stiffening agent (e.g. starch) and the intermediate plies are impregnated with a sizing agent (e.g. wax/rosin size) to render them impervious to the stiffening agent. After the web has been consolidated by hot moist pressing, its outer surfaces may be further sized and hot moulded.

15 Claims, 1 Drawing Figure

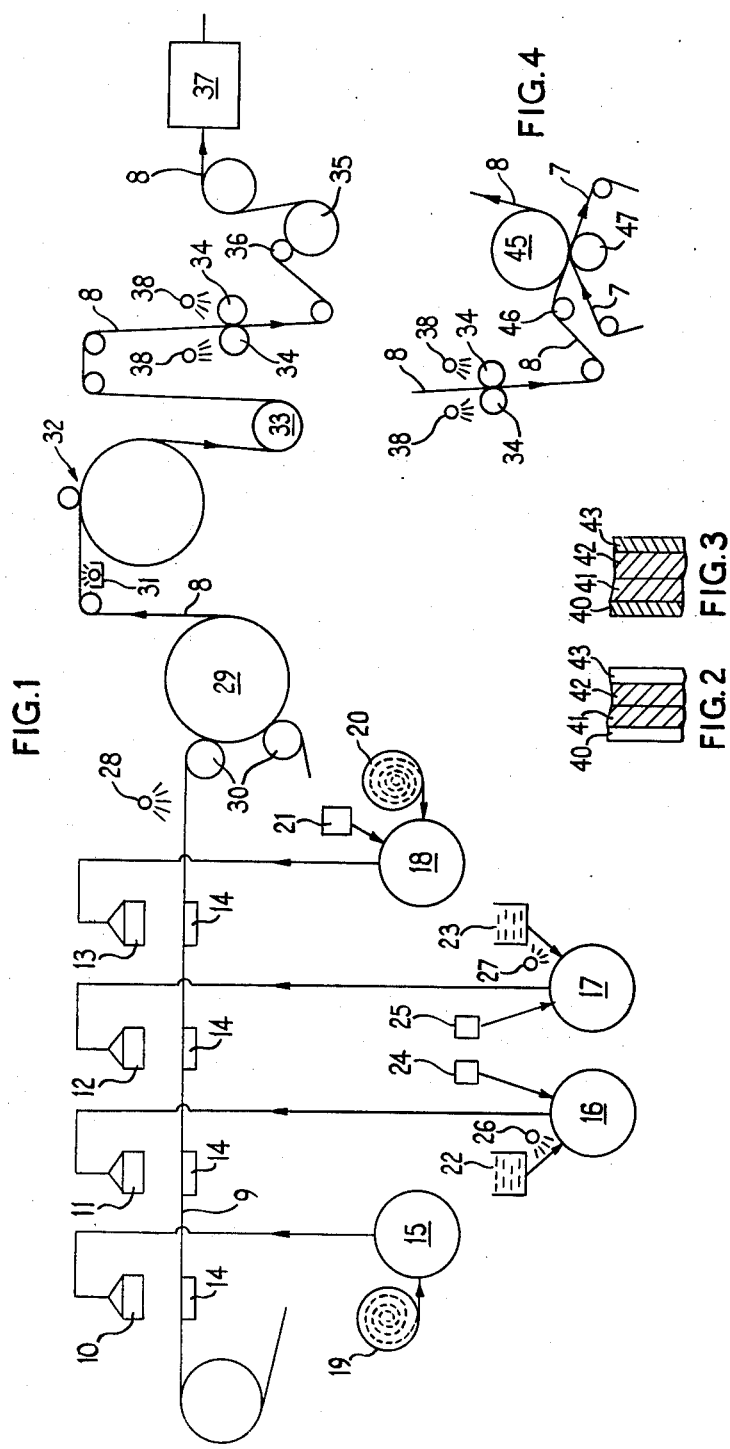

TREATMENT OF FIBROUS MATERIAL

This is a continuation of application Ser. No. 617,647 filed Sept. 29, 1975, now abandoned.

This invention relates to a method for the treatment of fibrous material in the dry forming of a layer of fibres on a forming surface, and to a product made by the method.

In a typical process for dry forming a fibrous web, dry fibrous raw material, e.g. wood cellulose, which has been defibred in a hammer mill into discrete fibres is conveyed in a stream of carrier air to a dispenser from which it is laid by the stream of carrier air onto a foraminous forming surface or band, suction being applied to the underside of the band immediately beneath the dispenser by a suction box to assist in the formation of the fibrous web.

If it is desired to produce a multi-ply paper or board by the above process it is convenient to provide a series of dispensers, each with its corresponding suction box, spaced in succession along the band. Consequently, successive plies will be laid one on top of the other. Each dispenser is typically supplied with fibre from a hammer mill associated with that dispenser.

The process and apparatus described above with reference to multi-ply formation of dry-formed paper or board will hereinafter both be referred to as "of the type described".

According to one aspect of the present invention, there is provided, in a process of the type described, a method of making a multi-ply consolidated dry-formed fibrous web having at least three plies comprising impregnating an outer ply with a stiffening agent, and impregnating an intermediate ply with first sizing agent rendering it relatively impervious to the stiffening agent of the outer ply.

Preferably, the first sizing agent is added to the body of fibre constituting the intermediate ply at a hammer mill associated with the formation of the intermediate ply.

The multi-ply web may be consolidated by hot moist pressing.

When the web has been consolidated it may be further treated by applying a second sizing agent to the web when dry or substantially dry to provide the web with a required moisture content, and hot moulding a surface of the sized moist web.

When the method is used in the production of a multi-ply folding box board, the stiffening agent may be starch and the first sizing agent may be a wax/rosin size.

The second sizing agent is preferably selected from the group including starch, gelatine, latex compounds, polyvinyl acetate or combinations thereof, with or without mineral matter such as clay.

The second sizing agent may be applied to one or both sides of the web.

According to a second aspect of the present invention there is provided a multi-ply consolidated dry-formed fibrous web comprising a pair of outer plies impregnated with a stiffening agent, and an intermediate ply impregnated with an agent rendering it relatively impervious to the stiffening agent of the outer plies.

The stiffening agent may be a starch, and the impregnating agent of the intermediate ply may be a wax/rosin size.

The difference in starch content of the plies together with other factors ensures that the degree of consolidation of the inner ply may be reduced relative to that of the outer plies. This difference together with the differing starch contents and possible fibre furnish will concentrate stiffness at the surface and improve delamination between outer and inner plies of the board to facilitate creasing without cracking.

The invention is described merely by way of example with reference to the accompanying drawings of which, FIG. 1 is a diagrammatic view of a machine for forming a multi-ply web of fibrous material according to the invention, FIG. 2 is a cross-section through a product according to the invention, at an intermediate stage in its manufacture, FIG. 3 is a cross-section through the product of the invention, in its final form, and FIG. 4 is an alternative form of the machine shown in FIG. 1.

Referring to FIG. 1 of the drawings there is shown a machine for making a multi-ply board from dry-laid fibres. The machine comprises an endless plastics foraminous band 9 on which dry fibres are laid from a succession of distributor heads 10, 11, 12, 13 spaced along the band. Vacuum, or suction boxes 14 are located underneath the band 9, beneath each distributor head, thus holding the fibres on the band. Thus, each distributor head provides a ply of the final board, heads 10, and 13 providing the outer plies, and 11 and 12 the inner plies.

Each distributor head 10, 11, 12, 13 is supplied with comminuted fibre, or a mixture of comminuted fibre and other substances, from hammer mills 15, 16, 17, 18 respectively.

Hammer mills 15 and 18 are fed with dry wood pulp from reels 19, 20 respectively. About 8% by weight of dry Viscosol, a dry starch, is added to the pulp in hammer mill 18 from a starch source 21.

Pre-broken dry groundwood pulp is fed into hammer mills 16, and 17 from receptacles 22, 23 respectively, and, before it enters the hammer mills, is sprayed with a water-resistant wax/rosin size from sprays 26, 27 respectively. 10% by weight of Viscosol dry starch is also added to the pulp in hammer mills 16 and 17 from starch sources 24, 25 respectively. Consequently, the inner plies laid down by distributor heads 11 and 12 will be water-resistant by virtue of the water-resistant rosin/wax size they contain.

The resulting dry-laid multi-ply web 8 is then moistened by a water spray 28 on its uppermost ply (i.e. the one laid down by distributor 13) to provide a moisture content of about 35% by weight. The moist web is consolidated by the passage around the surface of a steam heated cylinder 29 at a temperature of 110° C, being pressed into contact therewith over one quarter of its periphery by press rolls 30 at nip pressures of between 100 – 250 lb per linear inch (p.l.i.).

On leaving the cylinder 29 the web 8 is moistened on its underside (i.e. the ply laid down by distributor 10) by a water spray 31 of 5–10% solution of VISCOSOL starch. The moistened web has a moisture content of 15–20% by weight. The web passes through a nip 32 defined by a stream heated roll at 110° C and a pressure roll applied at a pressure of 20–100 p.l.i. to consolidate the underside or back ply. The web then passes round a drying cylinder 33 at 100° C. The dried web, containing typically 6–8% by weight moisture then passes through size press rollers 34 at a pressure of 50–250 p.l.i. A solution, e.g. of 80% Viscosol starch and 20% polyvinyl acetate is added at the press through nozzles 38. The size pressed web is subjected to a hot moist pressing or moulding action by passing around a steam heated cylinder 35 at a temperature of 110° C, being pressed into contact therewith by a rubber press roll 36 at a nip pressure of 20–50 p.l.i. This action smooths and consolidates the top surface of the board. A similar hot moist pressing action may be effected on the opposite surface by another or further heated cylinder and press roll. The web passes onto coating and finishing units depicted generally at 37.

The sizing agent added to the web 8 by nozzles 38 contains water and the quantity of agent used in controlled to ensure that the sized web which leaves the size press rollers 34 has a total moisture content by weight of between 15 and 30%, preferably about 25%.

An alternative method of treating the moist sized web after it leaves the rollers 34 is now described with reference to FIG. 4.

The sized moist web after leaving size press rollers 34 travels around a further guide roller 46 and is hot moulded or pressed by passing through the pressure nip of a large heated roll 45 which cooperates with a press roll 47 around which runs a felt 7. The moulded web then passes through the remainder of the finishing section which may involve a coater and calender rolls before being reeled up as finished board on a supply drum.

Alternative sizing agents in liquid form include gelatin, latex compounds, polyvinylacetate or combinations thereof, with or without mineral matter such as clay.

The sizing agent may be applied in any suitable manner. Instead of applying it to both surfaces of the web it may be applied to one surface only.

In this example the web grade is between 50 and 500 grams per square meter and is passed through the size press and hot moulding rolls at the rate of 200 feet per minute. The roll 45 is steam heated to produce a surface temperature of between 200° and 400° F. The nip pressure between the moulding rolls 45, 47 is between 50 and 250 lbs per linear inch.

The roll 45 has a smooth surface or a patterned surface depending on the required surface finish of the web. The roll 45 acts on the upper surface of the web, i.e. the surface not bearing the forming wire mark or the like.

In a modification of the invention, the web leaving the moulding rolls 45, 47 is hot moulded again but this time the other or wire-marked surface of the web is acted on by the large heated roll of a further set of moulding rolls. If the web leaving the moulding rolls 45, 47 lacks sufficient moisture for the further hot moulding, it is re-sized to provide the required moisture content before being passed to the further moulding rolls. With re-sizing, both web surfaces may be re-sized or, if only one surface is sized.

Where the roll 45 has a smooth surface, it has been found that the invention provides the web with an excellent smooth surface or surfaces for subsequent printing.

Thus this example shown by FIG. 4 provides a method of treating a web of fibrous material made by a dry-forming technique wherein after the web has been formed, consolidated and dried it is sized to produce a moisture content of about 25% by weight and then the sized moist web is hot moulded by passing it through a pressure nip formed by a heated roll co-operating with a pressure roll.

The effect of the size pressing and hot pressing of the starch-containing outer plies of the web shown in FIGS. 1 and 4 is to stiffen and strengthen these outer plies. Penetration into the middle plies is limited by virtue of the amount of water-repellent size in the middle plies. The stiffeneing agents (e.g. starch) are thus concentrated in the outer plies, which are the ideal regions for improving the stiffness of the web.

Strng of the middle plies thus inhibits the take-up of stiffening chemicals such as starch which are applied to the other plies.

In FIG. 2 there is shown a section through the web immediately after it has passed over drying roll 33. The inner plies 41, 42 contain water-repellent size and the outer plies 40, 43 contain starch. Both faces have been consolidated. The web typically has a stiffness of 8 Kenley Units. After passing through the size press 34 the stiffness of the web typically becomes 12 Kenley Units.

In FIG. 3 there is shown a section through the web after it has passed through the size press 34 and hot moist pressing (consolidating) cylinder 35. Considerable additional stiffness and strength has been given to the outer plies 40, 43 but not transmitted to the middle plies 41, 42. Typically the web has developed a stiffness of 15 Kenley Units. The finished web comprises in a typical example, top and back liner plies of chemical pulp with 18% Viscosol starch and 1% p.v.a. and middle ply or plies of mechanical pulp with 8% Viscosol starch and 3% size. Each ply is normally not homogeneous but increases in concentration of additives towards the surface.

The use of certain sizes (e.g. wax-based) in the middle plies can by themseles and by their action in resisting penetration of stiffening agents, bring about a reduction in the degree of consolidation in the middle plies relatie to the outer plies. Changes in the degree of consolidation can also be effected by other factors e.g. moisture content and heat. These differences together with the differing content of stiffening agents in the plies will provide a barrier between the inner and outer plies. This barrier will effect the degree of delamination between the inner and outer plies on creasing and can thus improve the foldability of the web.

The strength and stiffness of the final web is therefore concentrated in is outer layers, and a barrier is created between the middle plies and outer plies to facilitate delamination between these plies on folding the board.

Variations may be made in the example of the method described above. Less, or no starch may be applied to the pulp for the middle plies. The sizing agent for the middle plies may contain a bonding or cross-linking agent such as gums or hemicelluloses. Starch may be added to the pulp for the first dispenser 10, or variations made in the amount of starch added to dispenser 13 or spray unit 31 or at 28. In place of starch, other materials such as hemicelluloses or carboxy-methyl cellulose may be used to modify the basic web to give the required stiffness/strength/fold characteristics. Nip pressure and cylinder temperatures may be varied to suit individual web requirements. Different types of pulp may be used for the various plies.

The invention may be applied to web for folding box-board moulding boards, fluting medium or container board.

What we claim is:

1. A method of making a multi-ply consolidated dry-formed essentially cellulosic fibrous web having at least three plies including an outer ply, at least one intermediate ply and a second outer ply, and wherein the intermediate ply or plies is or are impregnated with a sizing agent and in continuous contact with the outer plies, comprising the steps of:

dry-forming said outer ply, dry forming at least one said intermediate ply and dry forming said second outer ply, including sandwiching the intermediate ply between said outer plies in continuous contact therewith and consolidating the three plies together by hot moist pressing thereof into a self-sustaining multi-ply web, each said dry forming step including laying down the cellulosic fibers as a ply in a dry state, and including adding moisture to the dry laid plies prior to said consolidating step, impregnating said outer plies with a stiffening agent to render them stiffer than the intermediate ply or plies, and wherein said sizing agent of the intermediate ply or plies has the characteristic of rendering the intermediate ply or plies relatively impervious to the stiffening agent of the outer plies.

2. The method of claim 1, including the step of impregnating the body of fibrous material which is to form the intermediate ply or plies just prior to the formation of said body of fibrous material into said intermediate ply or plies.

3. The method of claim 2, wherein the body of fibrous material of the intermediate ply or plies is processed in a hammer mill prior to formation thereof into said intermediate ply or plies, and including adding said sizing agent to said body of fibrous material in the hammer mill.

4. The method of claim 1, wherein the body of fibrous material of the outer plies are processed in a hammer mill prior to formation thereof into said outer plies, and including adding the stiffening agent to the body of fibrous material of the outer plies in the hammer mill.

5. A method as claimed in claim 1, wherein the stiffening agent is applied to the outer plies of the web after the intermediate and outer plies have been formed into a multi-ply web, and subsequently passing the web through a size press.

6. A method as claimed in claim 1, including further treating the consolidated web by applying a second sizing agent to the web when dry or substantially dry to provide the web with a required moisture content, and pressing a surface of the sized web while moist and with heat.

7. A multi-ply consolidated web comprising a pair of outer plies of dry-formed essentially cellulosic fibrous material impregnated with a stiffening agent, and an intermediate ply of said dry-formed essentially cellulosic fibrous material which is impregnated with an agent rendering is relatively impervious to the stiffening agent of the outer plies, said stiffening agent being present in an amount sufficient to render the outer plies stiffer than the intermediate ply, each of said plies having the characteristics of having been dry formed by the laying down of cellulosic fibers thereof as a ply in a dry state followed by consolidation of the plies resulting from hot moist pressing thereof, and said intermediate ply being in continuous contact over both of its surfaces with the two outer plies.

8. A web as claimed in claim 7, wherein the stiffening agent is a starch.

9. A web as claimed in claim 7, wherein the impregnating agent of the intermediate ply or plies is a wax/rosin size.

10. A method as claimed in claim 6 wherein the hot pressing is achieved by passing the web through a pressure nip between a heated roll and a press roll.

11. A method as claimed in claim 1 wherein the consolidating step comprises spraying the web with water to provide a moisture content of about 35% by weight, passing the web around the surface of a steam heated cylinder of a temperature of about 110° C, and pressing the web into contact therewith by press rolls at nip pressures of between 100–250 lb per linear inch.

12. A method as claimed in claim 6 wherein the required moisture content lies between 15 and 30% by weight and the pressing is carried out at a temperature of about 110° C and a pressure of 20–50 lb per linear inch.

13. A method as claimed in claim 11 when used in the production of a multi-ply folding boxboard, wherein the stiffening agent is starch and the first sizing agent is a wax/rosin size.

14. A method as claimed in claim 6 wherein the second sizing agent is selected from the group consisting of starch, gelatine, latex compounds, polyvinyl acetate or combinations thereof.

15. A method as claimed in claim 14 wherein clay is added to the second sizing agent.

* * * * *